United States Patent Office 3,453,100
Patented July 1, 1969

3,453,100
METHOD FOR COMBATING GROWTH OF UNDESIRABLE VEGETATION
William J. Cunningham, Somerset, N.J., assignor to Allied Chemical Corporation, New York, N.Y., a corporation of New York
No Drawing. Continuation-in-part of application Ser. No. 311,332, Sept. 25, 1963. This application Apr. 14, 1967, Ser. No. 630,794
Int. Cl. A01n 9/24, 5/00
U.S. Cl. 71—124           6 Claims This invention is concerned with herbicidal compositions comprising hydrates of hexafluoroacetone and pentafluorochloroacetone, and with methods for combating growth of undesirable vegetation by subjecting the same to the herbicidal action of compositions comprising hydrates of hexafluoroacetone and pentafluorochloroacetone.

---

This application is a continuation-in-part of our co-pending application Ser. No. 311,332, filed Sept. 25, 1963, now abandoned.

This invention relates to herbicides, herbicidal compositions, and to methods for employing the same to effect deterioration or destruction of undesired vegetation.

Major objectives of the invention are to provide fluoro herbicides, herbicidal compositions of the same, and processes for using the same to bring about extensive and long-lasting control of undesirable vegetation. The invention aims to provide for the killing of plant roots, for the killing of seedlings at or soon after sprouting, for the nonselective control of mono- and dicotyledonous plants, and particularly for nonselective defoliation or kill of brush and trees.

The invention is based on the discovery of the herbicidal properties of the tri- and monohydrates of pentafluorochloroacetone, $CF_3COCF_2Cl$, and hexafluoroacetone, $CF_3COCF_3$. These materials may be considered as $CF_3COCF_2Hal \cdot xH_2O$, where Hal is selected from the group consisting of chlorine and fluorine, and $x$ is a whole odd number from one to 3. In general, such materials may be made by contacting, preferably as sole reactants, a fluorinated ketone—selected from the group consisting of $CF_3COCF_2Cl$ and $CF_3COCF_3$—and liquid-phase water in amount equivalent to at least one mol of $H_2O$ per mol of fluorinated ketone, while in a reaction medium preferably consisting of fluorinated ketone and water, and while maintaining temperature such that any free water present is in liquid phase, and recovering from the resulting reaction mass fluorinated ketone $\cdot xH_2O$ where $x$ is a whole odd number from one to 3. Under normal conditions, $CF_3COCF_2Cl$ is a gaseous compound having the boiling point of plus 8° C., and a melting point of minus 133° C., and $CF_3COCF_3$ is a gaseous compound having a boiling point of minus 27° C., and a melting point of minus 129° C.

$CF_3COCF_3 \cdot 3H_2O$ is a constant boiling, water-white liquid at atmospheric pressure, boiling at about 105° C. It has been reported in the literature as a hydrate of $CF_3COCF_3$. A. T. Morse et al. in Canadian Journal of Chemistry, vol. 33, No. 3 (March 1955), p. 456 discloses it as "hexafluoroacetone hydrate, B.P. 55–6° C. at 80 mm." Chemical Abstracts, vol. 54 (1960), 20841(a), discloses it as "perfluoroacetone hydrate, $b_{90}$ 50°." Henne et al., in Journal of the American Chemical Society, vol. 72 (1950), p. 3578, discloses it as $CF_3COCF_3$ hydrate, B.P. 57° at 93 mm.

Strictly speaking, a hydrate is a true compound. The art has, however, used this term loosely to describe compositions which are not true compounds but which behave in some respects as true compounds, such as by exhibiting a constant boiling point.

$CF_3COCF_3 \cdot 3H_2O$ exhibits many properties characteristic of a true compound. Recent study of the freezing characteristics of this composition has, however, indicated that $CF_3COCF_3 \cdot 3H_2O$ is in fact not a true compound but is a constant boiling distillable mixture satisfying the empirical formula $CF_3COCF_3 \cdot 3H_2O$. To facilitate expression and to be consistent with the prior art terminology for the constant boiling mixture $CF_3COCF_3$ and three (3) moles of $H_2O$, this composition will be referred to herein as a hydrate and, more particularly, as the trihydrate of $CF_3COCF_3$.

$CF_3COCF_2Cl \cdot 3H_2O$ is a constant boiling, water-white liquid at atmospheric pressure, boiling at about 105° C. and also will be referred to as a hydrate.

The following illustrate production of mono- and trihydrates of hexafluoroacetone.

EXAMPLE A

Apparatus employed included a single-necked flask provided with a magnetic stirrer, and at the top of the neck with a Dry Ice-acetone cold finger. Incoming reactants charged consisted of water and $CF_3COCF_3$. About 92.5 g. (5.144 m.) of water were introduced into the flask. With constant stirring of flask contents, vaporous $CF_3COCF_3$ was fed into the cold finger in which $CF_3COCF_3$ condensed and then dropped as liquid into the water. During a period of about 6 hrs., about 577 g. (3.48 m.) of $CF_3COCF_3$ were thus fed into the flask, and were absorbed in the water. During addition of the $CF_3COCF_3$, the contents of the flask warmed up to about 40° C. At this stage, the flask contained about 680 g. of liquid material, and mol ratio of $CF_3COCF_3$ to $H_2O$ of such material was about 1:1.48. The contents of the flask were split into two approximately equal increments each containing about 1.74 m. of $CF_3COCF_3$ and about 2.57 m. of $H_2O$. To a first increment of about 344 g. in a suitable flask equipped with a cold finger, an additional 157 g. (0.95 m.) of $CF_3COCF_3$ were added in the manner described above, at which point no more $CF_3COCF_3$ was absorbed. Temperature in the flask was about 15–30° C. Contents of the flask comprised a slightly moist mass composed of long, needle-like white solid crystals containing $CF_3COCF_3$ and $H_2O$ constituents in mol ratio of about 2.69 to about 2.57 and having a melting point of about 40° C., and constituting the monohydrate, $CF_3COCF_3 \cdot H_2O$. The neck of the flask was connected to a distillation column having a cooled head. On heating the contents of the flask gradually up to a pot temperature a little below about 105° C., the solids melted at about 40° C., and there was distilled over a gas which, when condensed in a Dry Ice trap, amounted to about 196 g. (1.18 m.) of water white liquid. The gas discharged from the distillation column during distillation was subjected to infrared analysis which showed the C=O group and otherwise the known pattern of $CF_3COCF_3$. Condensate, resulting from cooling of the gas, was distilled in a separate operation and found to have the minus 27° C. B.P. of anhydrous $CF_3COCF_3$.

When discharge of gas, identified to be $CF_3COCF_3$, from the top of the distillation column ceased, the latter was put on reflux maintained at 105° C. On take-off of product from the column, temperature including pot temperature remained at about 105° C., over the entire distillation operation to a substantially dry and empty pot. During distillation there was produced an off-gas which when condensed at about room temperature amounted to about 146 g. (0.65 m.) of water white liquid. The latter was analyzed by nuclear magnetic resonance and was found to contain 52.95% (by weight) of fluorine and 2.68% of hydrogen, corresponding theoretical values for $CF_3COCF_3 \cdot 3H_2O$ being 51.8% and 2.73%. The found values indicate about 71.1% hexafluoroacetone and 24.1% $H_2O$ as compared with theory values of about 75.5% and 24.5% respectively. In the formula $CF_3COCF_3 \cdot xH_2O$, $x$ calculated on the basis of hydrogen analytical result equals 2.92 m., and $x$ calculated on the basis of the fluorine result equals 2.73 m. Hexafluoroacetone was quantitatively recovered by distilling a sample of the product in the presence of concentrated sulfuric acid. Accordingly, on heating the substantially solid crystalline monohydrate, $CF_3COCF_3 \cdot H_2O$, disassociated to hexafluoroacetone, $$CF_3COCF_3$$

and the hexafluoroacetone trihydrate, $CF_3COCF_3 \cdot 3H_2O$. Under normal conditions the latter is a water white liquid constituting a distillable material having a boiling point of about 105° C. The material is miscible with water in all proportions, and other tests show specific gravity at 25° C., of about 1.6, and a melting point of about minus 11° C.

EXAMPLE B

To the second increment of Example A, i.e., about 336 g. of liquid material containing about 1.74 m. of $$CF_3COCF_3$$

and about 2.57 m. of $H_2O$ at about room temperature, there was added about 46 g. (2.56 m.) of water. The result was a water white liquid containing $CF_3COCF_3$ and $H_2O$ constituents in mol ratio of about 1.74 to about 5.13, i.e., $CF_3COCF_3$ and $H_2O$ constituents corresponding to the trihydrate, $CF_3COCF_3 \cdot 3H_2O$. This liquor was distilled and boiled constantly to a substantially dry and empty pot at about 105° C., thus showing the liquid distilled to be the same as the pot residue distilled at about 105° C., constant boiling temperature in Example A.

The following illustrate production of the mono- and trihydrates of pentafluorochloroacetone.

EXAMPLE C

About 195 g. of $CF_3COCF_2Cl$ were condensed into a flask cooled in a Dry Ice-acetone slush. About 18 g. of water were added gradually to the $CF_3COCF_2Cl$. On completion of water addition, during which temperature was a little above zero, there was formed in the flask a slightly moist mass composed of white solid crystals containing $CF_3COCF_2Cl$ and $H_2O$ constituents in mol ratio of 1.07 to one, i.e., corresponding substantially to the monohydrate, $CF_3COCF_2Cl \cdot H_2O$. This material was found to have a melting point of 26.0–26.5° C. The neck of the flask was connected to a distillation column having a cooled head. On heating up the flask contents to a little below about 105° C., the solids melted at a little above 26–27° C., and there was distilled over a gas which, when condensed in a Dry Ice trap amounted to about 112 g. of water-white liquid. Infrared analysis of the latter showed the C=O group and otherwise known pattern of $CF_3COCF_2Cl$, and the material boiled at the plus 8° C. B.P. of anhydrous $CF_3COCF_2Cl$. When discharge of gas from the top of the distillation column ceased, the latter was put on reflux maintained at about 105–106° C. On take-off of further vaporous product from the column, temperature including pot temperature remained at about 105–106° C. during distillation to a substantially dry and empty pot. In the course of distillation, there was produced an off-gas which, when condensed to about room temperature, amounted to about 81 g. of water-white liquid. On the basis that initial addition of water to the $CF_3COCF_2Cl$ formed $CF_3COCF_2Cl \cdot H_2O$, and that during heating and distillation of the solid material the $$CF_3COCF_2Cl \cdot H_2O$$

was disassociated to $CF_3COCF_2Cl$ and $$CF_3COCF_2Cl \cdot 3H_2O$$

recovery of 112 g. of $CF_3COCF_2Cl$ compares with theoretical 121 g. recovery of $CF_3COCF_2Cl$, indicating a ketone loss. On the basis of the water charged, the 105–106° C. constant boiling liquor was the trihydrate of pentafluorochloroacetone. Instrumental NMR analysis of the constant boiling liquor for fluorine showed 39.8% by weight as compared with the 40.2% theory for $$CF_3COCF_2Cl \cdot 3H_2O$$

EXAMPLE D

About 36 g. (2.0 m.) of water and about 400 g. (2.2 m.) of $CF_3COCF_2Cl$ were incorporated and reacted in substantially the same manner as in Example C. There was formed in the flask a slightly moist mass of solid crystals, substantially the same as in Example C, having M.P. of about 26° C., and containing $CF_3COCF_2Cl$ and $H_2O$ constituents in mol ratio of about 1.1:1, corresponding substantially to $CF_3COCF_2Cl \cdot H_2O$. This mass was subjected to heating and distillation by procedure substantially the same as in Example C, and there were recovered about 260.8 g. of material boiling at plus 8° C., i.e., $$CF_3COCF_2Cl$$

and about 163 g. of material boiling at 105.5° C. During recovery of the approximate 105° C. fraction, pot temperature stayed constantly at about 105° C., the material was stable throughout distillation, and distillation was carried to a substantially dry and empty pot. On the basis of water and $CF_3COCF_2Cl$ initially charged, the 261 g. of 8° C., fraction recovered compares with about 279 g. theory recovery of $CF_3COCF_2Cl$.

On heating, the substantially solid crystalline monohydrate ($CF_3COCF_2Cl \cdot H_2O$), formed by incorporation of substantially equimolecular amounts of $H_2O$ and $$CF_3COCF_2Cl$$

disassociated to pentafluorochloroacetone, $CF_3COCF_2Cl$, and the pentafluorochloroacetone trihydrate, $$CF_3COCF_2Cl \cdot 3H_2O$$

Under normal conditions the latter is a water-white liquid constituting a distillable material having a boiling point of 105–106° C. The material is miscible with water in all proportions, and other tests show specific gravity at 25° C., of about 1.63, and a melting point of about minus 5° C.

EXAMPLE E

About 23.5 g. (0.1 m.) of the 105° C., B.P. pentafluoromonochloroacetone trihydrate product of Example D was introduced into a flask cooled in wet ice. About 41 g. (0.23 m.) of gaseous $CF_3COCF_2Cl$ were bubbled into the liquid trihydrate. On cessation of feed of $CF_3COCF_2Cl$, the contents of the flask comprised a slightly moist mass, substantially the same as in Example D, containing $CF_3COCF_2Cl$ and $H_2O$ constituents in mol ratio of 0.33:0.30. The resulting mass was heated gently at less than about 30%° C., and there were vaporized off and recovered about 7.5 g. of material indentified by infrared to be $CF_3COCF_2Cl$. The residue recovered in the flask was a relatively dry white crystalline solid material in amount of 57 g. corresponding to about 60 g. of $CF_3COCF_2Cl \cdot H_2O$ theoretically recoverable as $$CF_3COCF_2Cl \cdot H_2O$$

Melting point of the solid material was determined to be about 26.5° C.

The materials employed in practice of the invention are the mono- and trihydrates of $CF_3COCF_2Cl$ and $CF_3COCF_3$. Normally, $CF_3COCF_2Cl \cdot 3H_2O$ and $$CF_3COCF_3 \cdot 3H_2O$$

are water-white liquids constituting stable distillable materials each having boiling points of about 105–106° C., and having respective melting points of about minus 5° C. and minus 11° C. Under normal conditions, the monohydrates are white crystalline solids, the $$CF_3COCF_2Cl \cdot H_2O$$

having a melting point of about 26.5° C., and the $CF_3COCF_3 \cdot H_2O$ having a melting point of about 40° C.

The liquid trihydrates, especially $CF_3COCF_3 \cdot 3H_2O$ are preferred.

While useful as selective herbicides, the herbicidal compositions of the invention are dominantly useful as nonselective herbicides for control of established broadleaf or dicotyledonous varieties of plants such as smartweed, rape, lamb's-quarter, bindweed, horsenettle, Canada thistle, and broad-leaf plantain; control of established more pernicious monocotyledonous plants and grasses such as ryegrass, foxtail, crabgrass and nutgrass, Johnson grass, orchard grass, meadow grass and panicum species; and most particularly for nonselective defoliation or gill of brush and trees. The herein herbicides are also useful to provide complementary rapid herbicidal action when used in combination with slower acting herbicides.

Although the liquid trihydrates may be applied directly, as by spraying, to the area to be treated, for reasons of economy and uniformity of application preferably the trihydrate is incorporated with a suitable dispersion medium prior to application. Dispersion mediums may be liquids or pulverulent solids. The trihydrates are miscible with water in all proportions. This property affords the economic advantages of permitting ready make-up of aqueous spray solutions of any desired concentrations without the use of emulsifiers, agitated mixing equipment, etc., and application to the locus to be treated in the form of easily handleable aqueous solutions which may be applied by use of the simplest types of spray apparatus. Surface active agents may be used to enhance wetting, spreading and penetration properties of the sprays, and enhance herbicidal effects. While water is the preferred liquid dispersion medium, other liquid carriers such as acetone and glycols may be employed. Dispersants such as the latter may be used for dormant winter application on brush.

The solution or liquid dispersions may contain trihydrate, preferably $CF_3COCF_3 \cdot 3H_2O$, in amount as little as about 0.25 pound per 100 gallons, depending upon particular use. Each of the trihydrates may be impregnated on a solid pulverulent dispersion medium, preferably of the type which is capable of absorbing a substantial amount of liquid and yet appear sensibly dry. Typical solid diluents, which may be in finely divided or granular form, include diatomaceous earth, wood flours, silica gels, corn cob grits and vermiculite, with or without addition of wetting, dispersing and suspending agents. Hence, the trihydrate herbicidal material may be used as dusts which may contain as little as about 0.25%, more usually 5% to 20%, by weight of trihydrate. Each of the monohydrates may be employed in solid form, e.g., as the compounds per se or in mixtures with solid diluents or dispersion mediums in substantially the same fashion as described in the case of the trihydrates. Any of the known types of spraying or dusting apparatus may be used for applying the herbicide to the soil or vegetation to be treated, a primary consideration being uniformity of application.

The monohydrates also may be employed as herbicidal compositions in the form of liquid dispersions such as in aqueous solutions. As noted, the monohydrates are normally crystalline solids. Additions to a solid monohydrate, e.g. $CF_3COCF_3 \cdot H_2O$, of water in amount of about 0.4 mol per mol of $CF_3COCF_3$ constituent of the initial solid monohydrate results in the formation of a mass which is definitely liquid in the usual sense of the term, but is probably an indefinite mixture. Addition of further water up to an amount to provide total water in quantity equivalent to 3 mols of $H_2O$ per mol of $CF_3COCF_3$ effects formation of the definite distillable $$CF_3COCF_3 \cdot 3H_2O$$

material having a boiling point of 105° C. Further addition of water to provide total $H_2O$ in excess of 3 mols of water per mol of $CF_3COCF_3$ is believed to form a solution of $$CF_3COCF_3 \cdot 3H_2O$$

in water. However, the exact chemical forms taken by the $CF_3COCF_3 \cdot 3H_2O$ and/or $CF_3COCF_3 \cdot H_2O$ when added to water in quantity to provide spray solutions are not known or understood. On the other hand, it has been established that when either $CF_3COCF_3 \cdot 3H_2O$ and/or $CF_3COCF_3 \cdot H_2O$ is associated with water in amount in excess of 3 mols of $H_2O$ per mol of $CF_3COCF_3$, the only material separable from the aqueous solution is $$CF_3COCF_3 \cdot 3H_2O$$

which may be recovered as a still bottom in a distillation operated at pot temperatures of about 105° C. Hence, although $CF_3COCF_3 \cdot H_2O$ and $CF_3COCF_3 \cdot 3H_2O$ may lose identities as such on addition to water, nonetheless the monohydrate affords a liquid herbicidal composition when water is added to solid $CF_3COCF_3 \cdot H_2O$ in amount to provide at least about 1.4 mols of $H_2O$ per mol of $CF_3COCF_3$ constituent. The foregoing likewise applies to the $CF_3COCF_2Cl \cdot H_2O$. It is to be understood, however, that regardless of the type of hydrate in which the $CF_3COCF_3$ or $CF_3COCF_2Cl$ may be present in the herbicidal compositions of this invention, be it the monohydrate, the trihydrate, or mixture thereof, these compositions must contain the halogenated acetone associated with at least one mol of water per mol of halogenated acetone, but may contain the halogenated acetone associated with any amount of water in excess thereof, the only limit on water addition being the diminution of herbicidal efficacy by excessive dilution of the active hydrates. This applies to dispersions of the active hydrates in water as well as to their dispersions in nonaqueous liquid or solid dispersion media. Quantities of monohydrates employed may be similar to those of the trihydrates.

Whether used for selective or nonselective control, the herbicides of the invention may be applied to the vegetation to be treated in amounts (pound per acre) sufficient to afford the degree of control of vegetation desired in the given area. Application to vegetation includes application to vegetation per se or to the locus in the case of preemergence use. Optimum intensity of application will depend upon such factors as amount of vegetation in the area; degree of permanency of plant eradication desired; type of plants growing in the area and climatic conditions; and whether the objective is nonselective or selective control. Hence, applications employed depend largely on prevailing local conditions. In most instances, preemergence control, and control of, e.g. germinating weed seeds and small weed seedlings may be had by applying the hydrate at a rate of 2 pounds and upwards, more usually 2–4 pounds per acre. Where prolonged nonselective control of established vegetation is desired, particularly in the defoliation and killing of dense undergrowth, greater dosages of up to about 25 pounds per acre may be employed. Depending mostly upon local conditions and sought-for overall results, selections of dosages and hydrate concentrations in sprays and dusts are within the skill of the art.

The following illustrate practice of the invention.

EXAMPLE 1

A complex of established broadleaf weeds, grasses and woody plants (spurge, broad- and narrow-leaf plantain, bladder campion, dandelion, bunch grass, running blackberry, poison ivy, wild carrot, meadow grass, mullein, wild daisy, goldenrod, ragweed, Canada thistle and wild strawberry) was sprayed with 5, 10 and 25 pounds of $CF_3COCF_3 \cdot 3H_2O$ per acre as water solutions applied at the rate of 100 gallons per acre on a June 26th. Periodic observations thru the following September on topgrowth "brown-out" were then made with the results as follows:

| | Percent topgrowth browned out | | | | |
|---|---|---|---|---|---|
| | 6/28 | 7/25 | 8/7 | 8/21 | 9/24 |
| $CF_3COCF_3 \cdot 3H_2O$, per acre: | | | | | |
| 5 lbs | 5 | 75 | 75 | 65 | 40 |
| 10 lbs | 5 | 90 | 95 | 95 | 80 |
| 25 lbs | 10 | 98 | 99 | 99 | 95 |

EXAMPLE 2

In this series of tests, $CF_3COCF_3 \cdot 3H_2O$ was diluted 1:50, 1:100, 1:200 and 1:400 by volume with water and applied as a foliage spray to run-off on small dogwood, birch, poplar, maple, sumac, elm and mock orange trees. The 1:50 dilution was applied on August 1st, and the other dilutions on the following August 15th. Effects on foliage were as follows:

| | | Percent of Foliage | | | | | |
|---|---|---|---|---|---|---|---|
| | | Browned Out | | | Defoliated | | |
| | Species | 8/6 | 9/10 | 10/11 | 8/14 | 9/10 | 10/11 |
| Trihydrate, percent: | | | | | | | |
| 2 | Dogwood | 100 | 100 | 100 | 95 | 100 | 100 |
| 2 | Birch | 100 | 100 | 100 | 100 | 100 | 100 |
| 2 | Poplar | 95 | 100 | 100 | 80 | 100 | 100 |
| 2 | Maple | 95 | 100 | 100 | 99 | 100 | 100 |
| 2 | Sumac | 95 | 100 | 100 | 100 | 100 | 100 |
| 2 | Cattails | 90 | 100 | 100 | | | |
| | | 8/23 | 9/10 | 10/11 | 8/23 | 9/10 | 10/11 |
| 1 | Dogwood | 70 | 100 | 100 | 35 | 100 | 100 |
| 1 | Elm | 60 | 100 | 100 | 50 | 99 | 100 |
| 1 | Poplar | 95 | 100 | 100 | 75 | 100 | 100 |
| 1 | Sumac | 85 | 100 | 100 | | 100 | 100 |
| 1 | Mock Orange | 95 | 100 | 100 | 80 | 95 | 85 |
| 0.5 | Dogwood | 40 | 100 | 100 | | 100 | 100 |
| 0.5 | Birch | | 70 | 100 | | 40 | 100 |
| 0.5 | Poplar | 30 | | 98 | | | 98 |
| 0.5 | Maple | 50 | 90 | 100 | | 50 | 100 |
| 0.5 | Sumac | 35 | 100 | 100 | | 100 | 100 |
| 0.5 | Mock Orange | 95 | 90 | 70 | | 80 | 70 |
| 0.25 | Dogwood | 25 | 25 | 85 | | 15 | 85 |
| 0.25 | Poplar | 10 | 10 | 95 | | 10 | 95 |
| 0.25 | Elm | 20 | 95 | 100 | | 80 | 100 |
| 0.25 | Sumac | 30 | 70 | 100 | | 60 | 100 |
| 0.25 | Mock Orange | 20 | 100 | 85 | | 30 | 85 |

Additional observations showed that terminal buds were killed by the 2% and 1% sprays. The only regrowth of leaves which occurred in the year of the tests was on mock orange trees where the compound was applied at less than 2%.

EXAMPLE 3

Data noted were the results of preemergence greenhouse tests carried out by the macro-screening technique as described by Shaw and Swanson (Weeds, vol. 1, No. 4, p. 352, July 1952). Quantities of $CF_3COCF_3 \cdot 3H_2O$ used were as indicated made up to 40 gallons of water solutions per acre for spraying purposes. Test plot crops were corn and cotton, and ryegrass was considered representative of grassy weeds, and rape representative of broadleaf weeds.

| Dosage, Lbs./Acre | 2 | 4 |
|---|---|---|
| Corn: | | |
| IR | 1 | 3 |
| Percent HR | 2 | 33 |
| Percent PK | 0 | 0 |
| Cotton: | | |
| IR | 2 | 3 |
| Percent HR | 18 | 25 |
| Percent PK | 0 | 0 |
| Ryegrass: | | |
| IR | 4 | 6 |
| Percent HR | 40 | 60 |
| Rape: | | |
| IR | 3 | 5 |
| Percent PK | 30 | 45 |

IR=Injury Rating.—0=none; 1-3=slight; 4-6=moderate; 7-9=severe; 10=kill.
HR=Height Reduction.
PK=Plant kill.
In corresponding acetone and untreated checks, all of above values were zero.

EXAMPLE 4

In preemergence tests substantially the same as Example 3, quantities of $CF_3COCF_2Cl \cdot 3H_2O$ used were 16 lbs. made up to 40 gallons of acetone solution per acre for spraying purposes. Test plot crops were corn, wheat and soybeans, and ryegrass was considered representative of grassy weeds, and rape representative of broadleaf weeds.

Corn:
　IR ---- 1
　Percent HR ---- 3
　Percent PK ---- 6
Wheat:
　IR ---- 1
　Percent HR ---- 4
　Percent PK ---- 0
Soybeans:
　IR ---- 1
　Percent HR ---- 9
　Percent PK ---- 0
Ryegrass:
　IR ---- 5
　Percent PK ---- 45
Rape:
　IR ---- 5
　Percent PK ---- 45

In corresponding acetone and untreated checks, all of above values were zero.

EXAMPLE 5

In post-emergence greenhouse tests the quantities of $CF_3COCF_2Cl \cdot 3H_2O$ used were 16 pounds made up to 40 gallons of acetone solution per acre for spraying purposes. Test plot crops were corn and wheat, and rape was considered representative of broadleaf weeds. Injury ratings, taken 10 days after application, were—corn, zero; wheat 3; and rape, 8. In corresponding acetone and untreated checks all the foregoing values were zero.

In all embodiments of the invention, no matter how used, the herbicide is $CF_3COCF_2Hal$ associated with water in amount at least equivalent to $$CF_3COCF_2Hal \cdot H_2O$$

Where the solid monohydrates are used directly, i.e., as dusts, water associated with ketone constituent is water of constitution. Similarly, where the liquid trihydrates are utilized in the form of a phytotoxic amount impregnated upon a solid pulverulent dispersion medium, the water is likewise water of constitution of the trihydrates. In instances where the liquid trihydrates per se are used directly, such as sprays consisting of the liquid trihydrates, the water associated with ketone constituent is water of constitution. Where, as in the more usual operations, the solid monohydrates or the liquid trihydrates are added to a liquid dispersion medium, e.g., water, and applied as an aqueous spray, the water associated with ketone constituent is water of constitution plus other water. Thus, in customary practice using liquid spray solutions of relatively high dilutions it will be appreciated that when any mono- or trihydrate is added to, e.g., water to form a herbicidal composition comprising and usually consisting of a relatively dilute spray solution containing added hydrate in phytotoxic amount, the ketone component of the added hydrate is associated with water in amount much more than that equivalent to $CF_3COCF_2Hal \cdot 3H_2O$.

I claim:
1. The method for combating growth of undesirable vegetation which comprises applying to said vegetation, in amount sufficient to cause deterioration thereof, a herbicidal composition comprising $CF_3COCF_2Hal \cdot xH_2O$—where Hal is selected from the group consisting of chlorine and fluorine, and $x$ is a whole odd number from

1 to 3—associated with water in quantity at least equivalent to $CF_3COCF_2Hal \cdot H_2O$.

2. The method for combating growth of undesirable vegetation which comprises applying to said vegetation, in amount sufficient to cause deterioration thereof a herbicidal composition comprising $CF_3COCF_2Hal \cdot xH_2O$—where Hal is selected grom the group consisting of chlorine and fluorine, and $x$ is a whole odd number from 1 to 3—associated with water in quantity at least equivalent to $CF_3COCF_2Hal \cdot 3H_2O$.

3. The method for combating growth of undesirable vegetation which comprises applying to said vegetation, in amount sufficient to cause deterioration thereof, a herbicidal composition comprising $CF_3COCF_2Hal \cdot xH_2O$—where Hal is selected from the group consisting of chlorine and fluorine, and $x$ is a whole odd number from one to 3—associated with water in quantity more than that equivalent to $CF_3COCF_2Hal \cdot 3H_2O$.

4. The method for combating growth of undesirable vegetation which comprises applying to said vegetation, in amount sufficient to cause deterioration thereof, a dispersion medium containing added $CF_3COCF_2Hal \cdot xH_2O$ where Hal is selected from the group consisting of chlorine and fluorine, and $x$ is a whole odd number from one to 3.

5. The method for combating growth of undesirable vegetation which comprises applying to said vegetation, in amount sufficient to cause deterioration thereof, a solid pulverulent medium containing added $$CF_3COCF_3 \cdot 3H_2O$$

6. The method for combating growth of undesirable vegetation which comprises applying to said vegetation, in amount sufficient to cause deterioration thereof, an aqueous spray solution containing added $$CF_3COCF_3 \cdot 3H_2O$$

References Cited

UNITED STATES PATENTS

| | | | |
|---|---|---|---|
| 2,617,836 | 11/1952 | Pearlson et al. | 260—593.5 |
| 2,635,117 | 4/1953 | Wolf et al. | 260—593.5 |
| 2,764,479 | 9/1956 | Gilbert | 71—2.7 |
| 2,870,211 | 1/1959 | Miller | 260—593.5 |
| 3,323,984 | 6/1967 | Szabo et al. | 167—22 |

OTHER REFERENCES

Morse et al.: Canadian Journal of Chemistry, vol. 33, No. 3, 1955, p. 456.

Henne et al.: Journal of the Americal Chemical Society, vol. 72, 1950, p. 3578.

Chemical Abstracts, vol. 54, 1960, col. 20841(a).

JAMES O. THOMAS, JR., *Primary Examiner.*

U.S. Cl. X.R.

71—70, 76